United States Patent Office 3,649,682
Patented Mar. 14, 1972

3,649,682
OXIDATION IN THE PRESENCE OF SACCHARIDES
Bruno J. Barone, Houston, Tex., assignor to Petro-Tex Chemical Corporation, Houston, Tex.
No Drawing. Filed Dec. 30, 1968, Ser. No. 788,035
Int. Cl. C07c 63/02
U.S. Cl. 260—524 R                 13 Claims

ABSTRACT OF THE DISCLOSURE

A process for the oxidation of mononuclear aromatic compounds having at least one oxidizable group selected from methyl, hydroxymethyl, and aldehyde, in the presence of oxygen, cobaltous or cobaltic ions and an organic regulator or activator selected from the class comprising monosaccharides, disaccharides, trisaccharides, and other polysaccharides which yield these materials under the conditions of the system, and mixtures thereof, at about 60° C. to about 160° C., and at atmospheric pressure or greater.

BACKGROUND OF THE INVENTION

This invention relates to an improved method for the oxidation of aromatic compounds characterized by a single aryl group having at least one oxidizable group selected from methyl, hydroxymethyl, and aldehyde. More particularly, the invention relates to an improved process for the efficient and economical conversion of suitable methyl and dimethyl substituted monoaryl compounds to aromatic monobasic and dibasic acids.

Previous studies in this field have evolved a variety of proposed processes for the catalytic liquid phase oxidation of alkylated aromatic compounds in the presence or absence of a solvent by means of air or oxygen using various metals or salts thereof as catalysts. A variety of organic compounds such as peroxides, aldehydes, and ketones, have been proposed and utilized as reaction initiators or activators, and at least one commercial process employs bromine or bromides as catalytic aids.

French Pat. 1,392,284 discloses the use of metals having a valence greater than one and a single valence state as effective co-catalysts with cobaltous or cobaltic ions for the conversion of specified aromatic compounds to aromatic carboxylic acids. Yields reported in the patent without the use of additional catalytic agents are said to be from 45 percent to 70.8 percent desired product.

The present invention has for its principle object the provision of a novel process for the economical and efficient conversion of aromatic compounds to useful oxidation products such as toluic acid, terephthalic acid, and various other compounds. A further object is to provide a method whereby methyl and dimethyl substituted benzenes may be directly oxidized to the desired products without the necessity of going through intermediate steps. Additional objects include the provision of such a process which yields directly products of high purity or having a small content of readily separable impurities, and which involves reaction conditions that are operable at low cost and readily controlled.

The above and other objects are accomplished in accordance with this invention by carrying out the reaction with the materials and the operating conditions hereinafter described. All parts are by weight unless specified otherwise.

SUMMARY OF THE INVENTION

Broadly, the invention comprises reacting a monoaryl compound containing at least one oxidizable group selected from methyl, hydroxymethyl, and aldehyde with oxygen in an inert medium or solvent at a temperature of from about 60° C. to about 160° C. at atmospheric pressure or greater, and in the presence of a catalytically active or effective amount of cobaltous ion, cobaltic ion, or mixtures thereof, and effective or co-catalytic amounts, as more particularly hereinafter described, of an organic regulator or activator selected from the class comprising monosaccharides, disaccharides, trisaccharides, and other polysaccharides which yield monosaccharides, disaccharides, and trisaccharides under oxidation conditions or conditions of the system, and mixtures thereof. More particularly the invention comprises a process for the oxidation of compounds of the type described in an inert medium or solvent and in the presence of oxygen at a temperature of from about 60° C. to about 160° C. at atmospheric pressure or greater, and in the presence of from about 0.3 to 24 grams per liter cobaltous or cobaltic ion or mixtures thereof, and a co-catalytically active or effective amount of an organic regulator or activator selected from the class comprising monosaccharides, disaccharides, trisaccharides and other polysaccharides which yield monosaccharides, disaccharides, trisaccharides under the conditions of the system, and mixtures thereof. In its preferred form the invention comprises a process for the oxidation of methyl or dimethyl substituted monoaryl compounds in an inert medium or solvent in the presence of oxygen at a temperature of from about 60° C. to about 150° C. at atmospheric pressure or greater, and in the presence of from 0.3 to 24 grams per liter cobaltous or cobaltic ion, or mixtures thereof, and a catalytically active or effective amount of an organic regulator or activator selected from the class comprising monosaccharides and polysaccharides which yield monosaccharides, disaccharides, trisaccharides conditions of the system, and mixtures thereof.

As may be seen, the process of the invention is applicable to a wide variety of materials. Typical starting materials include toluene, p-xylene, m-xylene, hydroxymethyl benzene (benzyl alcohol) and benzaldehyde, or mixtures containing such compounds. The aromatic starting material may contain, in addition to the specified group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid. Additional conversions attainable by the present invention include conversion of terephthaldehyde and p-tolualdehyde to terephthalic acid, and isophthalic aldehyde to isophthalic acid. Although no particular concentrations of the monoaryl compound are required, in practice concentrations of from about 0.3 and per liter to about 3.5 mols per liter, based on the total amount of solution present, are suitable. Concentrations from about 0.8 to about 3.0 mols per liter are preferred.

As noted above, either cobaltous or cobaltic ion (or both) should be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 15 grams is preferred. Thus, with the use of a 1 molar solution of the starting aromatic compound in acetic acid, the desired cobalt concentration may be supplied by the initial provision of about 0.03 to 0.20 mol of cobaltous acetate per liter of solution. Examples of cobaltous compounds which may be utilized are Co(CAC)$_2$·4H$_2$O, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mol per liter of the monocarboxylic acid media, more particularly hereinafter described, in order to reduce the induction period and to insure complete solubility of the cobalt compound. Water need not be used with the acetylacetonates. The water may be introduced directly or by the use of hydrated materials.

Suitable temperatures for the oxidation process in accordance with this invention are within the range of 60° C. to about 130° C. at atmospheric pressure, although temperatures up to about 160° C. may at times be used, with somewhat higher pressures up to about 50 atmospheres. The preferred operating temperatures are within the range of 80° C. to 130° C.

While air is the most economical source of oxygen, any suitable oxygen-containing gas such as pure oxygen, ozone, or mixtures of such gases with inert gaseous diluents may be employed. It will, of course, be understood that in oxidizing substituted aromatic compounds in accordance with the invention, the oxygen supplied by continuous introduction of air or other oxygen-containing gas, as explained above, is the fundamental source of oxygen for the oxidation reaction, and sufficient oxygen must be supplied to complete the reaction.

It has been found that saccharides are effective, in conjunction with cobaltous or cobaltic ions, in improving the yields of the desired products. The saccharides which may be employed include the monosaccharides and polysaccharides, such as disaccharides, trisaccharides, as well as other polysaccharides which yield monosaccharides, disaccharides, or trisaccharides under oxidation conditions or the conditions of the system. In particular, the monosaccharides show superior activity and the disaccharides generally slightly less activity, possible due to the fact that it may be necessary that they be hydrolized under the conditions of the system to the monosaccharides. Examples of materials which may be employed include dextrose, fructose, glucose, sorbose, galactose, mannose, arabinose, allose, sucrose, maltose, lactose, cellobiose, raffinose, xylan, and pectin. In practice, the saccharide may be present in a concentration of from about 0.05 gram per liter to about 10.0 grams per liter, although these are not to be taken as limiting amounts. Preferred concentrations are from about 0.1 gram per liter to about 5.0 grams per liter. The total amount of saccharide can be added in portions or stages, as long as sufficient amount is present to enhance or give the desired catalytic effect.

The reaction is carried out in a suitable solvent or medium which is inert to the reactants or products under the oxidative conditions of the process, or is carried out in a solvent or medium which may be oxidized by the system to materials inert to the reactants or products. Preferred media for carrying out the reaction under the conditions set forth as described above, are the monocarboxylic acids selected from the group consisting of aliphatic acids having 2 to 6 carbon atoms, mixtures thereof, and aryl aliphatic acids having from 8 to 12 carbon atoms, and mixtures thereof. Acetic acid is preferred, although such media as propionic, butyric, trimethyl acetic, phenyl acetic, and/or such derivatives as methoxy acetic, and the like, may be used.

Although not required, prior art catalytic aids and "initiators," may be employed to aid in the attack on the hydrocarbon molecule, especially at lower temperatures. The preferred initiators are aldehydes and ketones such as paraldehyde, acetaldehyde, and methyl ethyl ketone. The aldehydes, propionaldehyde, tolualdehyde and isobutyraldehyde, and the ketones, diethyl ketone, methyl propyl ketone, and 2,5-hexanedione are particularly effective. The initiator, when utilized, is present at the beginning of the reaction or is added incrementally in a total amount usually from about 0.01 to about 0.5 mol per liter of solution. The initiator may also be added after the fashion described in U.S. application Ser. No. 617,803, to Barone, filed Feb. 23, 1967, wherein the initiator, or the major portion thereof, is added during the period in the course of the reaction that the reaction experiences its maximum rate of oxidation or oxygen uptake.

Certain metallic elements are effective in additionally improving the yields and/or rates of the reaction. In general, the metals of the Periodic Table having a valence greater than 1+, but having only a single valence or primary oxidation state, are effective in accomplishing increased yields and faster reaction rates. Exemplary are Be, Mn, Mg, Ca, Sr, Ba, Sc, Y, La, Zr, Hf, Ac, Ta, Mo, W, Ru, Rh, Cd, Zn, B, Al, Ga, In, Nd, Pr, Gd, Tb, and Th and mixtures thereof. In addition to Ta, one other element of Group Vb, i.e. Nb, and mixtures of Nb and Ta, show activity.[1] Especially effective are Al, Zr, La, Nd, Th, Zn, B, Mo, and Nb. These elements, or mixtures thereof, may be in the form of inorganic and organic salts, oxides, hydroxides and complexes, the only requirement being that sufficient amounts of the specified elements be present to provide a catalytic or effective amount of ions in the solution during the course of the reaction. For example, the metal ions may be added in the form of compounds or complexes such as the oxalates, the acetylacetonates, the alcoholates, the chlorides, the octoates, acetylacetates and the like. Salts of the lower fatty acids are especially useful, e.g., the acetates, propionates and butyrates. The metals having a single or primary valence greater than 1+ should be present in amount of from 0.05 to 9.5 grams per liter. A preferred amount is from 0.05 to 4.9 grams per liter. The concentrations of the metals of Group Vb, other than tantalum, may be substantially less, e.g., on the order of 0.01 gram per liter to 1.75 grams per liter. In particular, effective results are obtained with niobium at a concentration of from 0.01 gram per liter to 1.0 gram per liter.

The following, non-limiting examples illustrate the effectiveness and efficiency of the invention.

EXAMPLE I

An acetic acid solution containing 1.0 mol per liter p-xylene and 5.9 grams per liter cobaltous ion as cobalt acetate-tetrahydrate was charged into a reactor provided with suitably valved gas inlet and outlet lines for admission of oxygen. The temperature of the reactor was held at about 100° C. and the reaction carried out under atmospheric pressure. As a matter of convenience, the reaction was carried out for over 23 hours, although it was clear that the bulk of the oxidation had been completed long before the end of this time period. Results indicated a terephthalic acid yield of 54.5 percent and a p-toluic acid yield of 44.9 percent.

EXAMPLE II

The procedure of Example I was repeated except that 0.9 gram per liter of dextrose was added to the system. Results showed 100 percent of the p-xylene was consumed to give yields of 38.5 percent p-toluic acid and 60.3 percent terephthalic acid respectively.

EXAMPLE III

The procedure of Example I was repeated except that 0.45 gram per liter fructose was added to the system. The conversion of p-xylene was 100 percent for a terephthalic acid yield of 60.3 percent and a p-toluic acid yield of 38.6 percent.

EXAMPLE IV

The procedure of Example I was repeated except that approximately 1.7 grams per liter of maltose was added to the system. Results indicated a conversion of p-xylene of 100 percent for a terephthalic acid yield of 57.3 percent and a p-toluic acid yield of 41.6 percent.

---

[1] This group is based on the Periodic Table as found on pages 400–401 of the Handbook of Chemistry and Physics, 39th (1957–58) edition, Chemical Rubber Publishing Company.

EXAMPLE V

The procedure of Example I was repeated except that about 0.4 gram per liter of lactose was added to the system. The conversion of p-xylene was 100 percent for a terephthalic acid yield of 58.2 percent and a p-toluic acid yield of 40.7 percent.

EXAMPLE VI

The procedure of Example I was repeated except that about 0.4 gram per liter of sucrose was added to the system. Results indicated a conversion of p-xylene of 100 percent for a terephthalic acid yield of 60.3 percent and a p-toluic acid yield of 38.7 percent.

EXAMPLE VII

In this example, the cobalt catalyst, 9/10 of the acetic acid, all of the fructose, and 1/8 of the p-xylene was added to the reactor initially, the remainder being added over an 80 minute period during maximum oxygen absorption. The total amount of catalyst employed was sufficient to give a cobaltous ion concentration of 22.1 grams per liter, the total amount of p-xylene utilized was sufficient to give a concentration of 2.5 mols per liter, and the total amount of fructose employed was sufficient to give a concentration of 2.2 grams per liter of solution. The temperature was maintained between 125° C. to 130° C., and pressure held at about 13.6 atmospheres. Reaction time was reduced to 4 hours. The yield of terephthalic acid was 85.2 percent, and the yield of p-toluic acid was 12.8 percent.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein, or required by the prior art.

I claim:

1. In a process for oxidizing monoaryl compounds containing at least one member selected from the group consisting of methyl, hydroxy-methyl and aldehyde comprising contacting .3 to 3.5 mols per liter of said monoaryl compound based on the total amount of solution with oxygen in an inert solvent selected from the group consisting of aliphatic acids having 2 to 6 carbon atoms, aryl aliphatic acids having 8 to 12 carbon atoms and mixtures thereof, in the presence of from about 1.0 to about 24 grams per liter of a member selected from the group consisting of cobaltous ion, cobaltic ion and mixtures thereof at a temperature of from 60 to 160° C. and a pressure of 1 to 100 atmospheres wherein the improvement comprises having present from 0.05 to 10 grams per liter based on the total amount of solution present, of an organic regulator selected from the group consisting of monosaccharides, disaccharides, trisaccharides, other polysaccharides which yield monosaccharides, disaccharides or trisaccharides under the conditions of the reaction and mixtures thereof.

2. The process of claim 1 wherein the monoaryl compound is present in an amount of from about 0.8 mol per liter to about 3.0 mols per liter, based on the total amount of solution.

3. The process of claim 1 wherein the member selected from the group consisting of cobaltous ion, cobaltic ion, and mixtures thereof, is present in an amount of from about 1.0 to about 8 grams per liter.

4. The process of claim 3 wherein the acid is an aliphatic acid having 2 to 6 carbon atoms.

5. The process of claim 4 wherein the temperature is from 70° C. to 130° C.

6. The process of claim 5 wherein the monoaryl compound is p-xylene.

7. The process of claim 6 wherein there is present 0.001 to 0.02 mol per liter of water, and the regulator is a monosaccharide or disaccharide.

8. The process according to claim 1 wherein there is present 0.01 to 0.5 mol per liter of an initiator comprising a ketone or an aldehyde.

9. The process of claim 8 wherein the member selected from the group consisting of cobaltous ion, cobaltic ion, and mixtures thereof, is present in an amount of from about 1.0 to about 8 grams per liter, and the regulator is present in solution in an amount of from about 0.007 gram per liter to about 8.0 grams per liter.

10. The process of claim 9 wherein the monoaryl compound is present in an amount of from about 0.8 mol per liter to about 3.0 mols per liter, based on the total amount of solution present.

11. The process of claim 10 wherein the monoaryl compound is p-xylene.

12. The process of claim 11 wherein there is present 0.001 to 0.02 mol per liter of water, and the regulator is a monosaccharide or a disaccharide.

13. The process of claim 12 wherein the initiator is selected from the group consisting of acetaldehyde, paraldehyde and methyl ethyl ketone, and there is present additionally an effective amount of a metal ion co-catalyst having a valence greater than 1+, but having only a single valence or primary oxidation state.

References Cited

UNITED STATES PATENTS

| 2,245,528 | 6/1941 | Loder | 260—524 |
| 3,334,135 | 8/1967 | Ichikawa | 260—524 |
| 3,361,803 | 1/1968 | Augustynowicz | 260—524 |

LORRAINE A. WEINBERGER, Primary Examiner

R. S. WEISSBERG, Assistant Examiner

U.S. Cl. X.R.

260—523 A